No. 890,322. PATENTED JUNE 9, 1908.
R. AARFLOT.
APPARATUS FOR TRISECTION OF ANGLES.
APPLICATION FILED SEPT. 12, 1907.
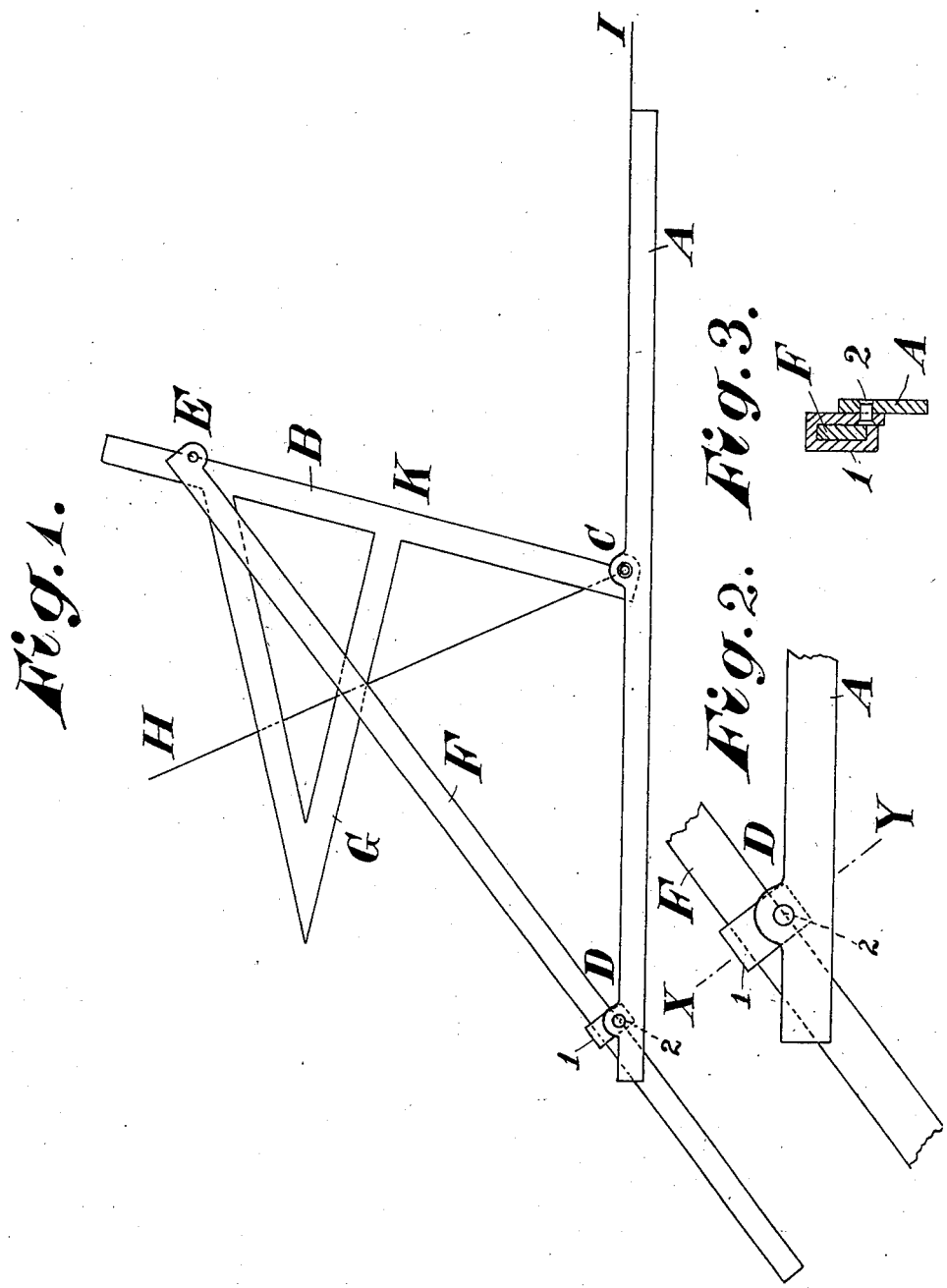
Witnesses
Edw. Enoch
C Corissa French
Inventor
Rasmus Aarflot
by
his Attorney

UNITED STATES PATENT OFFICE.

RASMUS AARFLOT, OF VOLDEN, NORWAY.

APPARATUS FOR TRISECTION OF ANGLES.

No. 890,322.　　　　Specification of Letters Patent.　　　　Patented June 9, 1908.

Application filed September 12, 1907. Serial No. 392,524.

*To all whom it may concern:*

Be it known that I, RASMUS AARFLOT, a subject of the King of Norway, residing at Volden, Söndmöre, Norway, have invented certain new and useful Improvements in Apparatus for Trisection of Angles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an apparatus for trisection of angles, a constructional form of which is shown in the accompanying drawing.

Figure 1 is a plan view of the device; Fig. 2 is a detail view of the manner of connecting the rule members A and F, and Fig. 3 is a section on the line X—Y of Fig. 2.

A is a ruler to which another ruler B is pivotally attached at C. At two pionts D and E equidistant from the point C respectively on the rulers A and B is a third ruler F pivotally and also slidably mounted; and at right angles to the ruler B equidistant from the points C and E is secured a fourth ruler G, one edge of which is perpendicular to the ruler B midway between said points.

The preferred means of pivotally and slidably connecting the members A and F is that shown in the drawing where the member F is provided with a sliding collar 1 pivotally connected to the rule member A by means of a pin 2.

A given angle HCI may by means of this apparatus be trisected in the following manner: The ruler A is placed along one arm (f. inst. CI) of the angle, so as to make the point C of the apparatus coincide with the vertex of the angle; then the ruler B is turned, until the rulers F and G cross each other just above the other arm HC of the given angle (or: until the rulers F and G and the other arm HC of the given angle intersect). The angle HCE is then ⅓ of the angle HCI.

The proof hereof may be given as follows:

$$\frac{CD = CE, Ck = EK \text{ and } G \perp B}{\angle EDC = \angle DEC = \angle HCE}$$
$$\angle ECI = \angle EDC + \angle DEC$$
$$\overline{\angle ECI = \angle HCE + \angle HCE = 2\angle HCE}$$

Claims.

1. In an apparatus for trisecting angles, the combination with a pair of pivotally connected rule members, of a third rule member pivoted to each member of said pair at a point equidistant from their common fulcrum and slidable upon one member of said pair, and a fourth rule member carried by and having one edge perpendicular to one rule member of said pair, substantially as described.

2. In an apparatus for trisecting angles, the combination with a pair of pivotally connected rule members, of a third rule member pivotally connected to one member of the said pair and pivotally and slidably connected to the other member of said pair at points equidistant from their common fulcrum, and a fourth rule member carried by and having one edge perpendicular to one rule member of said pair, substantially as described.

3. In an apparatus for trisecting angles, the combination with a pair of pivotally connected rule members, of a third rule member formed integrally with one member of said pair, and a fourth rule member pivotally and slidably connected to one member of said pair at a point equidistant from their common fulcrum, said third rule member having one edge perpendicular to one of the members of said pair of rule members.

In testimony that I claim the foregoing as my invention, I have signed my name in presence of two subscribing witnesses.

RASMUS AARFLOT.

Witnesses:
　SORRE BERG,
　M. GRAM.